United States Patent [19]

Teraoka et al.

[11] Patent Number: 5,037,362
[45] Date of Patent: Aug. 6, 1991

[54] LIMITED SLIP DIFFERENTIAL

[75] Inventors: Masao Teraoka; Susumu Ishikawa; Mitsuo Kawarai, all of Tochigi, Japan

[73] Assignee: Tochigi-Fugi Sangyo Kabushiki Kaisha, Tochigi, Japan

[21] Appl. No.: 498,844

[22] Filed: Mar. 26, 1990

[30] Foreign Application Priority Data

Mar. 28, 1989 [JP] Japan .......................... 1-35065[U]
Mar. 28, 1989 [JP] Japan .......................... 1-35066[U]

[51] Int. Cl.⁵ .......................... F16H 1/44; F16H 1/45
[52] U.S. Cl. ............................ 475/235; 475/230; 475/231; 475/233; 475/234; 475/240; 475/249
[58] Field of Search ............... 475/235, 234, 233, 231, 475/240, 249, 243, 244, 248

[56] References Cited

U.S. PATENT DOCUMENTS

| 2,720,796 | 10/1955 | Schou | 475/234 |
|---|---|---|---|
| 2,855,805 | 10/1958 | Fallon | 475/234 |
| 2,971,404 | 2/1962 | Thornton | 475/235 |
| 3,051,020 | 8/1962 | Hartupee | 475/235 |
| 3,053,114 | 9/1962 | Singer | 475/234 |
| 3,055,234 | 9/1962 | O'Brien | 475/234 |
| 3,224,299 | 12/1965 | Holdeman et al. | 475/235 |
| 3,264,900 | 8/1966 | Hartupee | 475/231 |
| 3,308,685 | 3/1967 | Wojcikowski | 475/235 |
| 3,326,063 | 6/1967 | Mazziotti | 475/234 |
| 3,327,557 | 6/1967 | Mieras | 475/235 |
| 3,327,558 | 6/1967 | Holdeman | 475/234 |
| 3,327,559 | 6/1967 | Engle | 475/235 |
| 3,327,560 | 6/1967 | Holdeman | 475/235 |
| 3,327,563 | 6/1967 | Engle | 475/235 |
| 3,327,564 | 6/1967 | Tharpe | 475/235 |
| 3,331,262 | 7/1967 | Mazziotti | 475/235 |
| 3,364,791 | 1/1968 | Truckle | 475/235 |
| 3,457,807 | 7/1969 | Altmann | 475/235 |
| 3,546,968 | 12/1970 | Altmann | 475/240 |
| 3,605,523 | 9/1971 | O'Brien | 475/234 |
| 3,815,442 | 6/1974 | McAninch et al. | 475/235 |
| 3,831,462 | 8/1974 | Baremor | 475/233 X |
| 3,886,813 | 6/1975 | Baremor | 475/240 |
| 3,929,036 | 12/1975 | Shealy | 475/235 |
| 4,290,321 | 9/1981 | Wilson | 475/235 |
| 4,838,118 | 6/1989 | Binkley | 475/231 X |

FOREIGN PATENT DOCUMENTS

| 2547883 | 12/1984 | France | 475/235 |
|---|---|---|---|
| 0159447 | 8/1985 | Japan | 475/231 |
| 0188654 | 9/1985 | Japan | 475/231 |
| 1112843 | 5/1986 | Japan | 475/231 |

Primary Examiner—Leslie A. Braun
Assistant Examiner—David E. Henn
Attorney, Agent, or Firm—Kinzer, Plyer, Dorn, McEachran & Jambor

[57] ABSTRACT

A limited slip differential for limiting differential rotation between a differential casing and axles via a frictional connection includes a pinion shaft rotating integrally with the differential casing and a pinion gear attached rotatively to the pinion shaft. A side gear engages with the pinion gear and is mounted loosely with respect to the axles. A first cam portion formed on the side gear engages with a second cam portion formed on a driving member which is spline-engaged with one of the axles, supporting the side gear and supported by and centered on the differential casing. A frictionally connecting clutch is disposed between the driving member and the differential casing.

4 Claims, 4 Drawing Sheets

LIMITED SLIP DIFFERENTIAL

BACKGROUND OF THE INVENTION

1. Field of the Invention

The present invention relates to a limited slip differential, and particularly to a limited slip differential for limiting differential rotation between right and left axles by means of producing frictional resistance between a differential casing and the axles.

2. Description of the Related Art

It has been proposed previously to form a limited slip differential in which a frictionally connecting means connects a differential casing and an axle, and due to the frictional resistance which is generated between the differential casing and the axle by way of the frictionally connecting means, differential rotation between the right and left axles is limited by the degree of frictional resistance.

A limited slip differential of the type described above, is one in which the frictionally connecting means are in the form of clutch plates alternately placed between a differential casing and a side gear which is mounted on an axle and is able to move in only the axial direction thereof. The clutch plates are forced against one another to obtain frictional resistance. Another limited slip differential of the type described above is one in which the frictionally connecting means are in the form of a torque transmitting member which moves with respect to an axle in only the axial direction thereof. The torque transmitting member is forced directly against the differential casing thereby obtaining frictional resistance.

A limited slip differential of this type has been disclosed in, for example, Japanese Patent Publication No. 18726/1966. The limited slip differential disclosed in Patent Publication No. 18726/1966 comprises a side gear loosely mounted on axles and engaging with a pinion gear; a first cam portion formed on the back of the side gear so as to protrude therefrom; a driving member spline-connected to the axles and which may move in only the axial direction of the axles; a second cam portion protruding from the driving member so as to engage with the first cam portion; and clutch plates functioning as frictionally connecting means and positioned between the driving member and the differential casing.

With the limited slip differential described above, the driving member is moved axially by means of a thrust force generated between the first and second cam portions which is produced by relative rotation between the side gear and the driving member. Due to the axial movement of the driving member, the clutch plates disposed between the driving member and the differential casing are forced against one another, whereby differential rotation between the right and left axles is limited.

In the limited slip differential described above, however, the side gear is not positively centered on the differential casing, but the centering is effected only because the side gear is mounted on the pinion gear. For this reason, there has been a problem in that centering of the side gear relative to the differential housing easily gets out of order so that reliability of this limited slip differential is poor.

OBJECTS AND SUMMARY OF THE INVENTION

The present invention aims to solve the problems described above contained in prior art.

An object of the present invention is to provide a limited slip differential the reliability of which is improved by making sure of centering of side gears relative to the differential casing.

A further object of the present invention is to prevent mis-alignment in the centering position by ensuring that the side gears are centered on a differential casing.

In order to attain the above objects, a limited slip differential according to the present invention is constructed in such that a first cam portion is formed on at least one of side gears, a second cam portion engaging with the first cam portion is formed on a driving member, the driving member is supported by a differential casing, and the side gear provided with the first cam portion is supported by the driving member which also has the second cam portion formed thereof, whereby this side gear is centered on the differential casing through the driving member, while another side gear not having a first cam portion is directly centered on the differential casing and is not mounted on the driving member.

In the limited slip differential having the above described construction, at least one of the side gears is placed floatingly on the driving member, so that the side gears are centered on the differential casing either through the driving member or directly.

When relative rotation appears between the side gear and the driving member, thrust force produced between the first cam portion and the second cam portion acts on the driving member so that the driving member is axially transferred due to the thrust force. Because of the axial transfer of the driving member, a frictionally connecting means disposed between the axles and the differential casing produces frictional resistance, whereby the differential rotation between the right and left axles is limited.

At least one of a pair of the right and left side gears is centered on the differential casing through the driving member. In the embodiment of FIG. 1, case where one of the side gears is not centered on the differential casing through the driving member, the one such side gear is directly centered on the differential casing. Accordingly, a pair of the right and left side gears are centered by means of the differential casing directly and indirectly. Such centering can be positively effected before installation of the limited slip differential in a vehicle, insuring that the centering position is correctly maintained.

BRIEF DESCRIPTION OF THE DRAWINGS

Embodiments of the present invention will now be described, by way of example with reference to the accompanying drawings, in which.

DETAILED DESCRIPTION OF THE PREFERRED EMBODIMENTS

Figure 1:
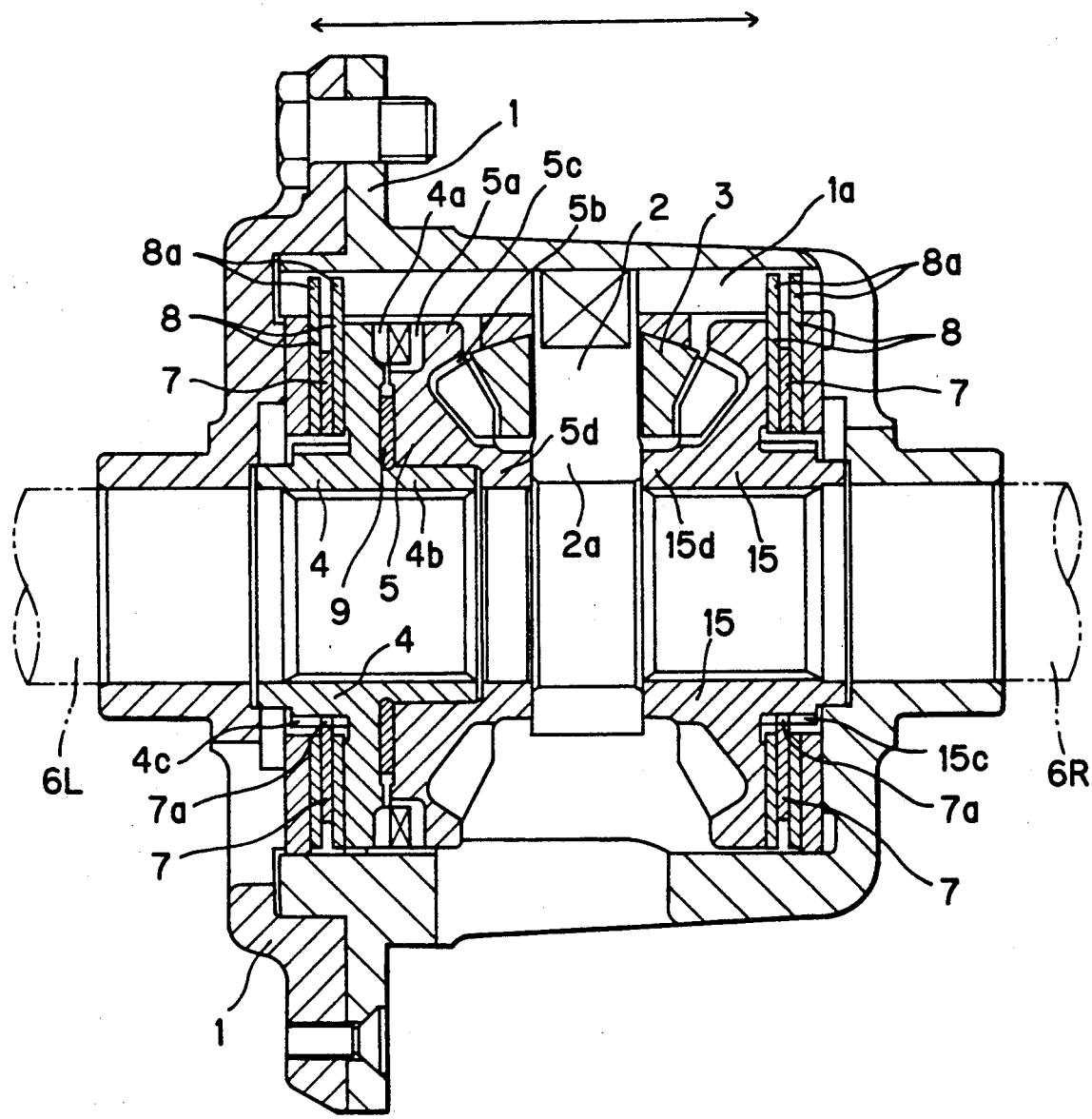
FIG. 1 is a vertical sectional view for explaining the construction of a first embodiment of the limited slip differential according to the present invention.
Figure 3:
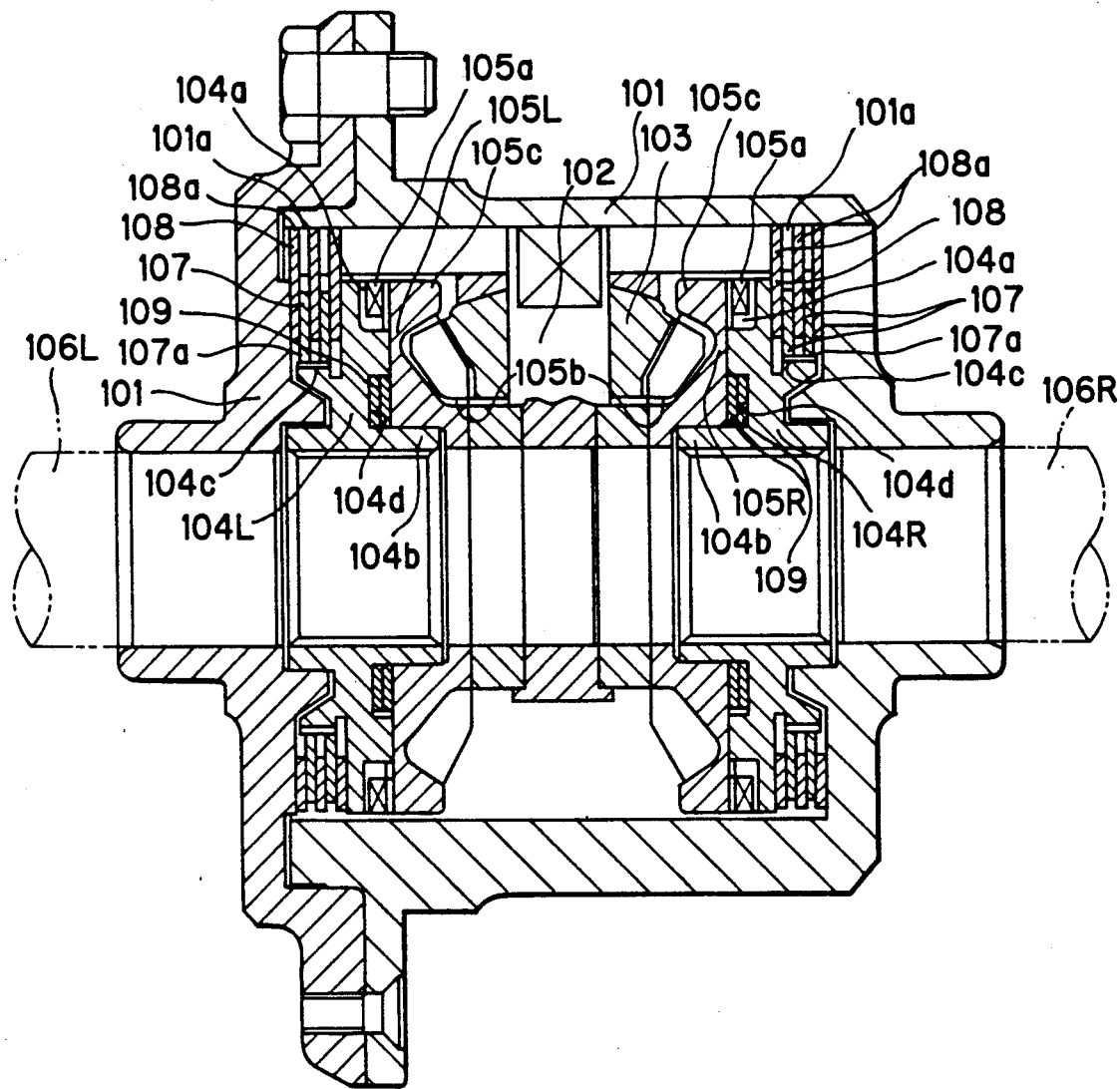
FIG. 3 is a vertical sectional view for explaining the construction of a second embodiment of the limited slip differential according to the present invention.

FIGS. 1 and 3 are explanatory views each showing an embodiment of a limited slip differential according to the present invention. The limited slip differential shown in FIG. 1 comprises a differential casing 1 driven by a drive pinion (not shown) through a ring gear (not shown); a pinion shaft 2 which is rotated together with the differential casing 1 and is mounted so that it is able to move in only the axial direction of arrow in FIG. 1; a pinion gear 3 mounted rotatably on the pinion shaft 2; a driving member 4 mounted on axle 6L of a pair of right and left axles 6R, 6L and able to move with respect to axle 6L in only the axial direction; first side gear 5 which meshes with the pinion gear 3 and is positioned floatingly on a boss portion 4b of the driving member 4; second side gear 15 which meshes with the pinion gear 3 and is mounted on the other axle shaft 6R and is able to move with respect to shaft 6R in only the axial direction; first clutch plates 7 each engaging with the driving member 4 or the second side gear 15 and second clutch plates 8 each engaging with the differential casing 1, said first and second clutch plates being disposed alternately between the differential casing 1 and the driving member 4 and between the differential casing 1 and the second side gear 15; and a spring means, for example, a disc spring 9 which is disposed between the side gear 5 and the driving member 4 for urging the first and second clutch plates 7 and 8 so as to force the former clutch plates against the latter ones. In this respect, it is to be noted that the frictionally connecting means of this embodiment is composed of the first clutch plates 7 and the second clutch plates 8.

The construction and operation of the first clutch plate 7 engaging with either the driving member 4 or the second side gear 15 and the second clutch plate 8 engaging with the differential casing 1 are described hereinbelow.

An inner surface lug portion 7a of each first clutch plate 7 engages with an engaging groove 4c of the driving member 4 or an engaging groove 15c of the second side gear 15, while an outer surface lug portion 8a of each second clutch plate 8 engages with an engaging groove 1a of the differential casing 1.

A first cam portion 5a having a substantially V-shaped profile is formed on the outer peripheral portion 5c of a gear portion 5b of the first side gear 5, while a substantially V-shaped second cam portion 4a engaging with the first cam portion 5a is formed on the outside diametrical side of the driving member 4.

The first side gear 5 is loosely mounted on the driving member 4, and the driving member 4 is centered on the differential casing 1. Thus the first side gear 5 is centered on the differential casing 1 via the driving member 4. The second side gear 15 is directly centered on the differential casing 1.

On the inner peripheral portions of both the side gears 5 and 15, protruding portions 5d and 15d are formed, respectively, and these protruding portions 5d and 15d abut upon a side of an inner peripheral portion 2a which functions as a transmitting member of the pinion shaft 2.

In the construction described above, torque introduced from the drive pinion (not shown) through the ring gear is transmitted to the differential casing 1, so that the differential casing 1 is rotated. The rotation of the differential casing 1 is transmitted to the pinion shaft 2 which, being mounted in the differential casing 1 and only able to move in the axial direction, is also rotated. The rotation of the pinion shaft 2 is transmitted to both of the side gears 5 and 15 through the pinion gear 3. The torque transmitted to the first side gear 5 is transmitted to the substantially V-shaped cam portion 4a being fitted into and engaged with the substantially V-shaped cam portion 5a, and hence the torque is transmitted to the driving member 4.

Figure 2:
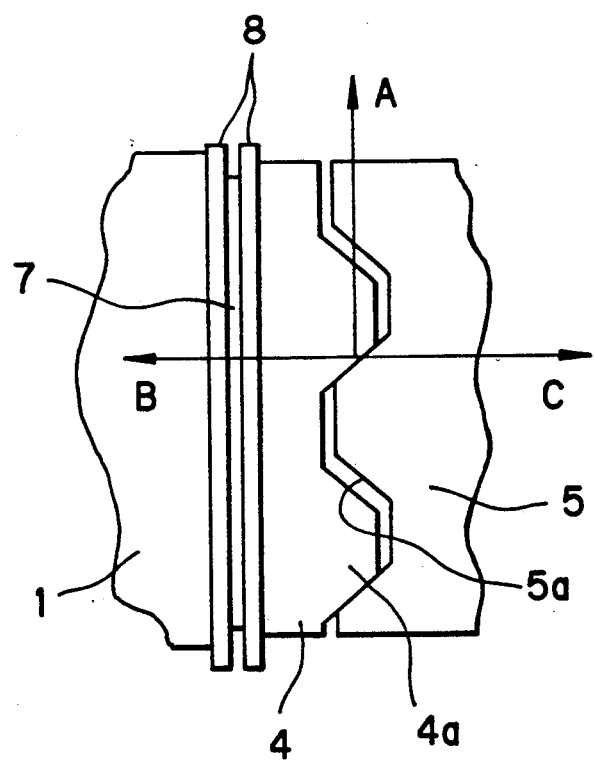
FIG. 2 is an enlarged schematic drawing showing an essential part of the relationship of the engagement of a first cam portion with a second cam portion in the limited slip differential shown in FIG. 1.

In FIG. 2, for example, when the first side gear 5 is rotated by the pinion gear 3 in the direction of arrow A, a thrust force is produced on driving member 4 in the direction of arrow B because of the cam action of the substantially V-shaped cam portion 5a and the substantially V-shaped cam portion 4a. This thrust force causes the driving member 4 to be pushed and moved in the direction of arrow B. Thus, in FIG. 1, the driving member 4 is moved to the left in the axial direction of axle 6L, and as a result the driving member 4 forces the first clutch plate 7 against the second clutch plates 8 in cooperation with the urging action of the disc spring 9. Because of this axial movement, torque is transmitted from the differential casing 1 to the axle 6L via the driving member 4.

The reaction force between the driving member 4 and the side gear 5 in FIG. 2 due to the above described thrust force produces a force on first side gear 5 in the direction of arrow C. Due to this reaction force, the protruding portion 5d of first side gear 5 urges portion 2a of the pinion shaft 2 towards the right in the axial direction in FIG. 1, so that the pinion shaft 2 is moved to the right in the axial direction. With the movement described above, the second side gear 15 is moved to the right in FIG. 1 due to the protruding portion 15d of the second side gear 15 abutting on the pinion shaft 2. The movement of the second side gear 15 forces the first clutch plates 7 engaging with the second side gear 15 against the second clutch plates 8 engaging with the differential casing 1, and hence torque is transmitted from the differential casing 1 to the axle 6R via the second side gear 15.

Because of the operation described above, differential rotation between the axles 6L and 6R is limited, and torque is transmitted to the axles 6L and 6R, respectively.

While it has not been particularly shown in detail, an arrangement wherein the pinion shaft 2 is mounted so that it cannot move in the axial direction and another member movable in the axial direction is provided separately from the pinion shaft 2 may also embody the present invention. In this arrangement the other member is mounted so as to abut on the side gears 5 and 15 so as to transfer force between them and to move the side gear 15 in the axial direction.

In the present embodiment, since both the side gears are centered on the differential casing, mis-alignment of the centering position is prevented.

An advantage of this embodiment is that components such as differential casing, pinion shaft, pinion gear and the like can be used also as compounds of a limited slip differential of the type which connects a frictionally connecting means such as clutch plates and the like by utilizing gear thrust derived from engagement of the pinion gear with the side gears. Accordingly, parts management becomes easy.

Furthermore, since the first and second cam portions are positioned only on either side of the device along the axial direction, the number of constructional parts is decreased, and the parts may be simplified so that the manufacturing cost is reduced.

Moreover, the disc spring 9 of a spring means is disposed between the driving member 4 and the side gear 5, and the right and left side gears are in contact with each other via the transmitting member in the present embodiment. Accordingly, an initial connecting force can be applied to the frictionally connecting means on both the right and left sides by means of only one disc spring 9.

Next, a second embodiment of the limited slip differential according to the present invention will be described in conjunction with FIGS. 3 and 4.

In this embodiment, the limited slip differential comprises a differential casing 101 driven from a drive pinion (not shown) through a ring gear (not shown); a pinion shaft 102 rotating together with the differential casing 101; a pinion gear 103 mounted rotatively on the pinion shaft 102; driving members 104L and 104R mounted on axles 106L and 106R respectively and able to move with respect to the axles in only the axial direction; side gears 105L and 105R each meshing with the pinion gear 103 and positioned floatingly on boss portions 104b of the driving members 104L and 104R; first clutch plates 107 each engaging with one of the driving member 104L or 104R and second clutch plates 108 each engaging with the differential casing 101 said first and second plates being disposed alternately between the differential casing 101 and the driving members 104L and 104R; and two disc springs 109, one of which disposed in a gap defined between the side gear 105L and the driving member 104L and one of which disposed in a gap between the side gear 105R and the driving member 104R, which urge the first and second clutch plates 107 and 108 together so as to force the first clutch plates 107 against the second plates 108.

The disc spring 109 is placed in a concave portion 104d defined on an inner peripheral portion of the driving member 104L or 104R to locate the same.

Furthermore, the driving members 104L and 104R are centered on the differential casing 101, respectively. As a result, it may be considered that the side gears 105L and 105R placed loosely on the driving members 104L and 104R are centered finally on the differential casing 101 through the driving members 104L and 104R, respectively.

The construction and operation of the first clutching plates 107 engaging with the driving members 104L and 104R and the second clutching plates 108 engaging with the differential casing 101 are such that an inner surface lug portion 107a formed on each of the first clutch plates 107 enqages with each engaging groove 104c defined on the driving member 104L or 104R, while an outer surface lug portion 108a formed on each of the second clutch plates 108 engages with each engaging groove 101a defined on the differential casing 101.

Each of first cam portions 105a having a substantially V-shaped profile is formed on a thickened portion 105c on the outer peripheral portion of each gear portion 105b of the side gears 105L and 105R, while each of second cam portions 104a having a substantially V-shaped profile and engaging with the cam portion 105a is formed on an outer peripheral portion of the driving members 104L and 104R.

In the construction described above, torque introduced from the drive pinion (not shown) through the ring gear (not shown) is transmitted to the differential casing 101, and the rotation of the differential casing 101 is transmitted to the pinion shaft 102 fitted into the differential casing 101, so that the pinion shaft 102 also rotates. The rotation of the pinion shaft 102 is transmitted to the side gears 105L and 105R via the pinion gear 103. The torque transmitted to the side gears 105L and 105R is transmitted to the substantially V-shaped second cam portion 104a fitting into and engaging with the substantially V-shaped first cam portion 105a, so that the torque is transmitted to the drive gears 104L and 104R.

Figure 4:
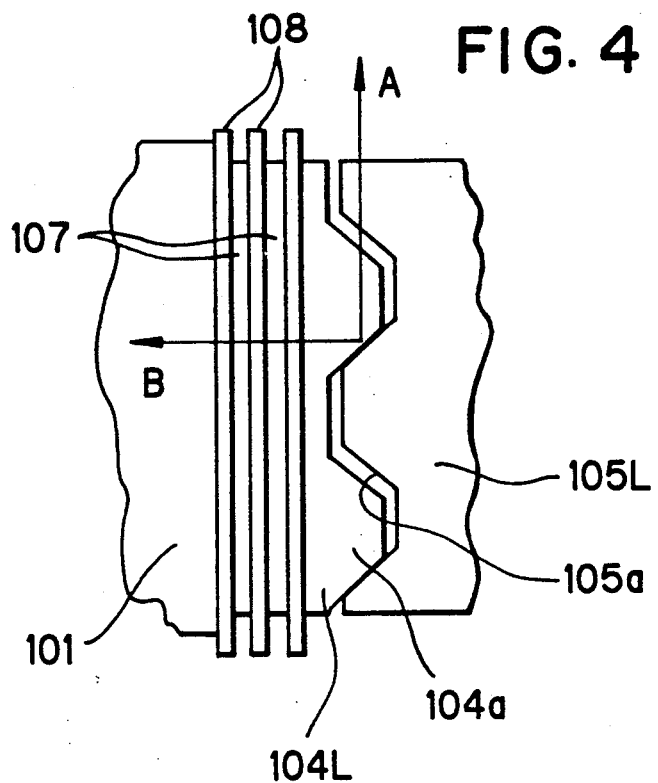
FIG. 4 is an enlarged schematic explanatory development showing an essential part of a relationship of the engagement of a first cam portion with a second cam portion in the limited slip differential shown in FIG. 3.

In FIG. 4, for example, when the side gear 105L is rotated by the pinion gear 103 in the direction of arrow A, a thrust force is produced on driving member 104 in the direction of arrow B because of thrust action derived from the substantially V-shaped first and second cam portions 105a and 104a. This causes the driving member 104L to be pushed and moved in the direction of arrow B. As a result, the driving member 104L is moved to the left along the axial direction in FIG. 3 and accordingly, the driving member forces the first clutch plates 107 against the second clutch plates 108 in cooperation with the urging action of the disc spring 9. Because of this torque is transmitted from the differential casing 101 to the axle 106L via the driving member 104L.

The same operation as described above is observed in the right half of FIG. 3, and more specifically torque is transmitted from the differential casing 101 to the axle 104R through the driving member 104R. Because of the operation as described above, differential rotation between the axles 106L and 106R is limited, and torque is transmitted to the axles 106L and 106R, respectively.

Relative rotation occurs between the side gear 105L (105R) and the driving member 104L (104R) during a short period of time until the thrust force derived from the action of the cam portions 105a and 104a generates enough torque between the side gear 105L (105R) and the driving member 104L (104R) so that the side gear 105L (105R) rotates integrally with the driving member 104L (104R). At all other times, however, the side gear 105L (105R) rotates commonly and integrally with the driving member 104L (104R), so that the disc spring 109 does not slide and no wear due to slide friction is observed.

In the present embodiment, since both the right and left side gears are centered on the differential casing through the driving members, mis-alignment of the centering position can be prevented.

Furthermore, each of the side gears rotates integrally and commonly with each of the driving members at any time other than the case where thrust force is produced between the side gear and the driving member due to thrust action. In this arrangement, since the disc spring is placed between the side gear and the driving member, wear of the disc spring can be prevented. As a result, there is no wear of the spring means so that no change (increase) occurs in the restoring force. Thus, the urging force of such spring means can be effectively utilized, and a constant state of limiting differential rotation can be stably maintained.

Figure 5:
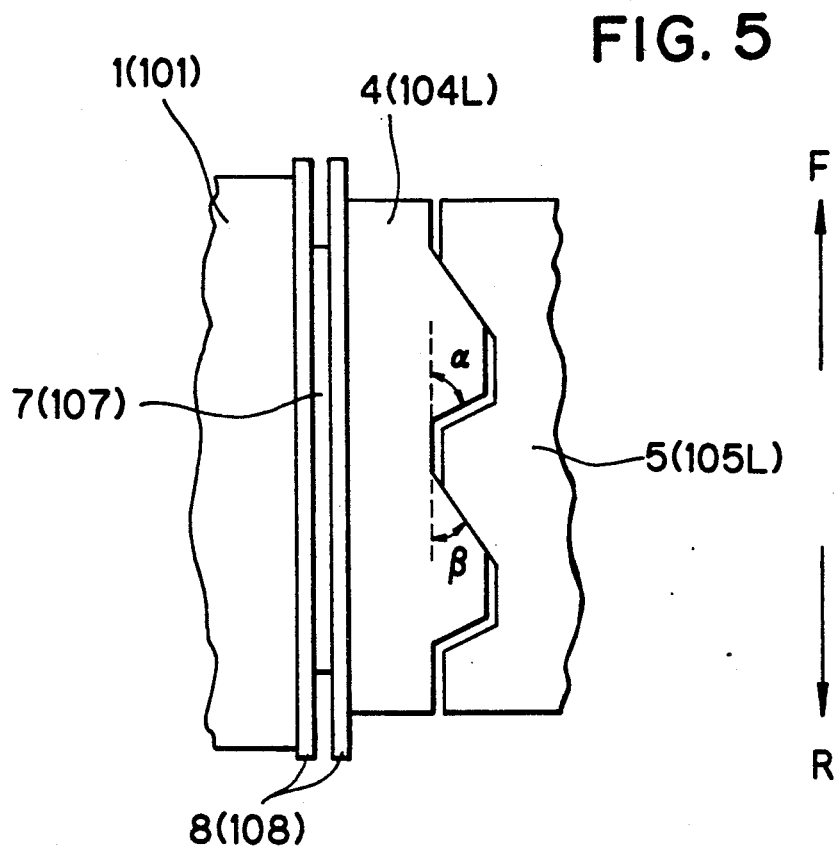
FIG. 5 is an enlarged schematic explanatory development showing a relationship of the engagement of a first cam portion with a second cam portion in the case where these cam portions are modified ones, respectively.

FIG. 5 illustrates a modified example of the limited slip differential according to the present invention wherein the cam angles of the first and second cam portions where they engage are made asymmetrical with respect to each other. In this example, the cam angle of the part of the first cam portion which engages with the second cam portion in the case when the differential rotates along the forward moving direction of the vehicle indicated by arrow F differs from that of the part of the first cam portion which engages with the second cam portion in the case when the differential rotates along the rearward moving direction of the vehicle indicated by arrow R. In other words, the cam angle $\alpha$ is made large in case of the engagement in the direction of arrow F, while the cam angle $\beta$ is made small in case of the engagement in the direction of arrow R.

In this modified example, the parts designed to be engaged in the case where the differential rotates in the direction of arrow R engage with each other in case of operating an engine brake, and the cam angle is small angle $\beta$, so that thrust force weakens, and hence such force for limiting differential rotation between the right and left axles becomes small. For this reason, when this modified example of the present invention is applied to the front wheel differential of a four-wheel drive or front wheel drive vehicle, good running characteristics are obtained.

While in the foregoing, preferred embodiments of the invention have been disclosed in considerable detail for purposes of illustration, it will be understood by those skilled in the art that many of these details may be varied without departing from the spirit and scope of the invention.

What is claimed is:

1. In a limited slip differential wherein a differential casing is allowed to be frictionally in contact with right and left axles through frictionally connecting means for producing frictional resistance between said differential casing and said right and left axles, and differential rotation between said right axle and said left axle is limited by means of said frictional resistance, said limited slip differential comprising:
   a pinion shaft rotating with said differential casing;
   a pinion gear mounted rotatively on said pinion shaft;
   at least one side gear engaging with said pinion gear and mounted for rotation with respect to said axles;
   at least one driving member splined to said axles and movable in the axial direction thereof, said driving member supporting said side gear and being supported by said differential casing;
   a first cam portion formed on said side gear;
   a second cam portion formed on said driving member and engaging with said first cam portion;
   said frictionally connecting means disposed between said driving member and said differential casing;
   spring means for producing an initial engagement between said frictionally contacting means being disposed between said side gear and said driving member;
   wherein torque is transmitted from said side gear to said driving member through said first and second cam portions, and said frictionally connecting means is fully engaged by thrust force produced by thrust action between said first cam portion and said second cam portion.

2. A limited slip differential as claimed in claim 1 wherein said pinion shaft rotates with said differential casing and is movable in only the axial direction thereof.

3. A limited slip differential as claimed in claim 1, said limited slip differential comprising:
   said one side gear engaging with said pinion gear and mounted for rotation with respect to one of said axles;
   another side gear engaging with said pinion gear, said another side gear splined to another of said axles and movable in the axial direction thereof, and supported by said differential casing;
   a driving member splined to said first axle and movable in the axial direction thereof, said driving member supporting said one side gear and being supported by said differential casing;
   a first cam portion formed on said one side gear;
   a second cam portion formed on said driving member and engaging with said first cam portion;
   said frictionally connecting means disposed between said driving member and said one side gear and said differential
   spring means for producing an initial contacting state between said frictionally contacting means being disposed between said one side gear and said driving member;
   wherein torque is transmitted from said side gear to said driving member through said first and second cam portions, and said frictionally connecting means is connected by thrust force produced by thrust action between said first cam portion and said second cam portion.

4. A limited slip differential as claimed in claim 3 wherein said pinion shaft rotates with said differential casing and is movable in only the axial direction thereof.

* * * * *